US012380916B2

(12) United States Patent
Monsarrat-Chanon

(10) Patent No.: US 12,380,916 B2
(45) Date of Patent: Aug. 5, 2025

(54) USER VOICE DETECTOR DEVICE AND METHOD USING IN-EAR MICROPHONE SIGNAL OF OCCLUDED EAR

(71) Applicant: EERS GLOBAL TECHNOLOGIES INC., Montréal (CA)

(72) Inventor: Hami Monsarrat-Chanon, Montréal (CA)

(73) Assignee: EERS Global Technologies Inc., Montreal (CA)

( * ) Notice: Subject to any disclaimer, the term of this patent is extended or adjusted under 35 U.S.C. 154(b) by 282 days.

(21) Appl. No.: 17/782,448

(22) PCT Filed: Dec. 3, 2020

(86) PCT No.: PCT/CA2020/000131
§ 371 (c)(1),
(2) Date: Jun. 3, 2022

(87) PCT Pub. No.: WO2021/108887
PCT Pub. Date: Jun. 10, 2021

(65) Prior Publication Data
US 2023/0012052 A1 Jan. 12, 2023

Related U.S. Application Data

(60) Provisional application No. 62/942,914, filed on Dec. 3, 2019.

(51) Int. Cl.
*H04R 1/10* (2006.01)
*G10L 25/78* (2013.01)

(52) U.S. Cl.
CPC ............ *G10L 25/78* (2013.01); *H04R 1/1016* (2013.01); *G10L 2025/783* (2013.01)

(58) Field of Classification Search
CPC ... G10L 25/78; G10L 2025/783; G10L 21/02; H04R 1/1016; H04R 1/1083; H04R 2460/01
See application file for complete search history.

(56) References Cited

U.S. PATENT DOCUMENTS 10,311,887 B2 * 6/2019 Goldstein ................ H04R 3/00
2017/0148428 A1 * 5/2017 Thuy .................... H04R 1/1083

* cited by examiner

*Primary Examiner* — Brian Ensey
(74) *Attorney, Agent, or Firm* — PRAXIS

(57) ABSTRACT

A device and a method for detecting voice of a user of an intra-aural device. The intra-aural device has an in-ear microphone adapted to be in fluid communication with an outer-ear ear canal of the user occluded from an environment outside the ear. A signal provided by the in-ear microphone is obtained to determine an acquired voice indicator signal, and a voice produced by the user is detecting by comparing the acquired voice indicator signal with a corresponding threshold value, upon the acquired voice indicator signal being larger than the corresponding threshold value.

10 Claims, 2 Drawing Sheets

USER VOICE DETECTOR DEVICE AND METHOD USING IN-EAR MICROPHONE SIGNAL OF OCCLUDED EAR

CROSS-REFERENCE TO RELATED APPLICATIONS

The present application claims the benefit of U.S. provisional patent application No. 62/942,914, filed on Dec. 3, 2019, and which is incorporated herein by reference.

TECHNICAL FIELD

The present disclosure relates to a device and method for voice detection. More specifically, the present disclosure relates to an intra-aural device and method for detecting voice of a user of an intra-aural device using an in-ear microphone signal of an occluded user's ear.

BACKGROUND

Traditionally, communication headsets use a boom microphone, placed in front of the mouth, to capture speech in noisy settings. Although directional, these microphones often suffer from a low signal-to-noise ratio (SNR) in noisy environments and require noise cancelation for enhancement. Alternatively, speech captured through bone and tissue vibrations has been used to provide a signal with a higher SNR. Bone conduction speech can be captured either by microphones placed inside an occluded ear or through bone conduction sensors placed somewhere on the cranium. Although speech generated from bone and tissue conduction can have a relatively high SNR, it suffers from a limited frequency bandwidth (less than 2 kHz), thus reducing signal quality and intelligibility. For applications in which quality and intelligibility are important (e.g. command and control), bone and tissue conduction speech can be a limiting factor. Therefore, to this day, communicating in noise is a difficult task to achieve as the communication signal either suffers from noise and/or voice (from surrounding people) interference, in case of airborne speech, or from limited bandwidth, in case of bone and tissue conducted (BTC) speech.

Communication headsets are a great way of combining good hearing protection and communication features. Most commonly, headsets made up of circumaural HPDs equipped with a directional boom microphone placed in front of the mouth are used. Circumaural HPDs can generally provide better attenuation than intra-aural HPDs, because they are easier to wear properly. The disadvantages of these types of communication headsets is two-fold. First, the boom microphone is exposed to the background noise and can still capture unwanted noise, air conducted, that can mask the speech signal of the wearer. Second, circumaural HPDs with boom microphones are not compatible with most other personal protection equipment. The use of other personal protection equipment alongside HPDs is common in noisy environments. For example, the use of helmets is required for construction workers as are gas masks for fire-fighters. Using bone and tissue conduction microphones to capture speech is a convenient way to eliminate both of those problems. Bone conduction sensors can be placed in various locations and can provide a relatively high SNR speech signal. As mentioned previously, however, the elevated SNR comes at a price of very limited frequency bandwidth of the picked-up signal, typically less than 2 kHz. As a consequence, the enhancement of bone and tissue conducted speech is a topic of great interest. Many different techniques have been developed for the bandwidth extension of BTC speech. Even though these techniques can enhance the quality of bone and tissue conducted speech, they are either computationally complex or require a substantial amount of training from the user, thus limiting their widespread use in practical settings.

An effective compromise between the two extremes of noisy air conducted speech and bandlimited BTC speech captured by bone conduction sensors is speech captured from inside an occluded ear using an in-ear microphone. Occluding the ear canal with an HPD, or more generally an intra-aural device, causes bone and tissue conducted vibrations originating from the cranium to resonate inside the ear canal leading the wearer to hear an amplified version of their voice, this is called the occlusion effect. By way of this occlusion effect, as a consequence of wearing an intra-aural device, a speech signal is available inside the ear and can be captured using an in-ear microphone. Therefore, occluding the ear canal with a highly isolating intra-aural device equipped with an in-ear microphone allows for the capturing of a speech signal that is not greatly affected by the background noise because of the passive attenuation of the intra-aural device. Another advantage of using an in-ear microphone instead of a bone conduction microphone is that the speech is still captured acoustically and can share a significant amount of information with clean speech, such as the one captured—in silence—in front of the mouth in the 0 to 2 kHz range. A bandwidth extension technique that utilizes non-linear characteristics should extend the bandwidth of the in-ear microphone signal and add the high frequency harmonics.

The above does not obviate the fact that before transmitting the captured voice for communication with co-workers, the user wearing the intra-aural device (acting as an occlusion barrier for the environment or ambient sound/noise) with an in-ear microphone inside the occluded ear (in fluid communication with the outer-ear ear canal of the user) still need to activate the communication system/device. This might prove to be difficult when both hands of the worker are occupied to accomplish work or the like. In such cases, the activation or triggering of the communication system/device with a user's hand could potentially cause some injuries to the worker or even an accident.

Industrial workers, or any other workers, seek natural interaction within groups which could have variable spatial configuration (worker next to each other vs far away from each other). In the case of a shared communication channel, one may not want to occupy the line when he/she is not talking. This is one of the reasons why a Push-to-Talk system is used on radio communication devices and the like (not accounting for the saving of batteries), but such systems require the worker/user to activate the system or the communication device. A good and interesting example would be a helicopter pilot who usually needs both his/her hands to pilot.

Accordingly, there is a need for a device and method for detecting a user's voice using an in-ear microphone in an occluded ear of the user.

SUMMARY

It is therefore a general object of the present disclosure to provide a device and method for detecting a user's voice using an in-ear microphone in an occluded ear of the user.

An advantage of the present invention is that the device or method requires only one microphone located inside an occluded ear of the user to detect the presence of voice from the user.

Another advantage of the present invention is that the device or method ensures that the detected voice is really from the user, and not an external voice from a person talking loud in proximity of the user, especially when used in conjunction with an outer-ear microphone, and even an in-ear speaker, and whether the user is in a noisy environment or not.

A further advantage of the present invention is that the device or method can also be used as a "user activity" detector or "alive" detector (man down functionality).

Yet another advantage of the present invention is that the device or method of the present invention performs well in noisy environments.

Still a further advantage of the present invention is that the device or method is fully compatible with passthrough mode, in the sound captured by the outer-ear microphone of an earpiece is played in the in-ear speaker to provide earpiece sound transparency, as opposed to known devices for which the in-ear-vox (in-ear user voice detection) would not work while passthrough is operating. In the present invention, the ratio of the in-ear voice indicator over the outer-ear indicator remains high because of the content of the microphone signals used.

According to an aspect of the present disclosure there is provided a method for detecting voice of a user of an intra-aural device, the intra-aural device having an in-ear microphone adapted to be in fluid communication with an outer-ear ear canal of the user occluded from an environment outside the ear, the method comprising the steps of:

- obtaining a signal provided by the in-ear microphone to determine an acquired voice indicator signal;
- detecting voice produced by the user by comparing the acquired voice indicator signal with a corresponding threshold value, upon the acquired voice indicator signal being larger than the corresponding threshold value, while reducing any voice interference coming from a non-user.

In one embodiment, the acquired voice indicator signal is an in-ear microphone voice indicator signal (IVIS) and the corresponding threshold value is an in-ear microphone threshold value (ITV).

Conveniently, the step of obtaining includes processing the signal provided by the in-ear microphone using a voice detector algorithm to determine the acquired voice indicator signal.

Conveniently, the step of obtaining includes the step of:

- averaging the in-ear microphone voice indicator signal (IVIS) over a predetermined time period.

Alternatively, the signal provided by the in-ear microphone is filtered over a predetermined frequency range.

In one embodiment, the intra-aural device has an outer-ear microphone adapted to be in fluid communication with the environment outside the ear, the method further comprising the step of obtaining a signal provided by the outer-ear microphone; and wherein the acquired voice indicator signal is a ratio of an in-ear microphone voice indicator signal (IVIS) over an outer-ear microphone voice indicator signal (OVIS), and the corresponding threshold value is a ratio threshold value (RTV), upon the outer-ear microphone voice indicator signal (OVIS) being larger than a predetermined floor level (PFL), and wherein the step of detecting voice produced by the user further removes any voice interference coming from a non-user.

Conveniently, the step of obtaining a signal provided by the outer-ear microphone includes processing the signal provided by the outer-ear microphone using the voice detector algorithm to determine the acquired voice indicator signal.

Conveniently, the step of obtaining includes the step of:

- averaging the in-ear microphone voice indicator signal (IVIS) and the outer-ear microphone voice indicator signal (OVIS) over a predetermined time period.

Alternatively, the signal provided by the in-ear microphone and the signal provided by the outer-ear microphone are filtered over a predetermined frequency range.

According to another aspect of the present disclosure there is provided a voice detector device for detecting voice of a user of an intra-aural device, the voice detector device comprising:

- an in-ear microphone adapted to be in fluid communication with an outer ear canal of an ear of the user occluded from an environment outside the ear; and
- a processing unit operatively connected to the in-ear microphone to receive an internal signal therefrom and to the outer-ear microphone to receive an external signal therefrom, the processing unit being configured so as to:
  - execute the above method for detecting voice of a user of an intra-aural device.

In one embodiment, the voice detector device further includes an outer-ear microphone adapted to be in fluid communication with the environment outside the ear; and wherein the processing unit operatively connects to the outer-ear microphone to receive an external signal therefrom.

Other objects and advantages of the present invention will become apparent from a careful reading of the detailed description provided herein, with appropriate reference to the accompanying drawings.

BRIEF DESCRIPTION OF THE DRAWINGS

Embodiments of the disclosure will be described by way of examples only with reference to the accompanying Figures, with similar references referring to similar components, in which.

DETAILED DESCRIPTION

Generally stated, the non-limitative illustrative embodiments of the present disclosure provide a device and method for detecting the presence of voice of a user of an intra-aural device having an in-ear microphone in fluid communication with an outer ear canal of a user's ear occluded from an environment outside the ear. It is to be understood that although the present disclosure relates mainly to a device and method for detecting the presence of voice of a user, the technique disclosed can also be used in conjunction with improving the quality of any of the signals from the in-ear microphone such as speech, and biosignals, including breath, heartbeat, etc., via adaptive filtering and bandwidth extension.

More specifically, this is performed, in real time, using an in-ear microphone located inside an occluded ear and, optionally, an outer-ear microphone.

Figure 1:
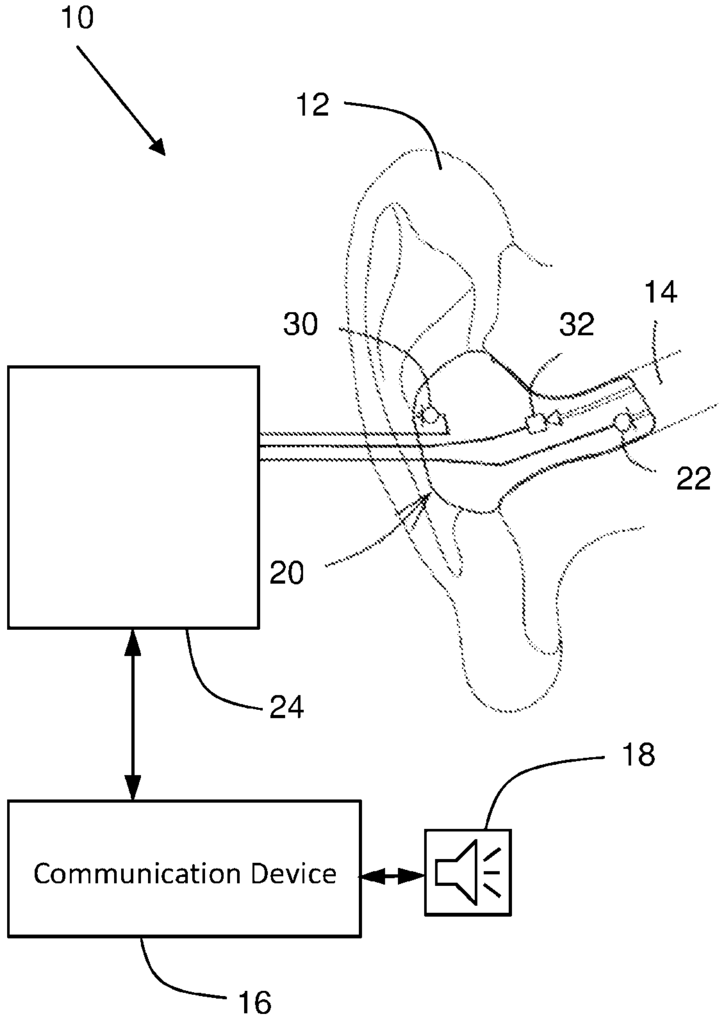
FIG. 1 is a schematic architecture diagram representation of a device for detecting voice of a user of an intra-aural device in accordance with an embodiment of the present invention, the intra-aural device having an in-ear microphone adapted to be in fluid communication with an outer-ear ear canal of the user occluded from an environment outside the ear.

Referring now to FIG. 1, there is shown an embodiment of a device 10 for detecting voice of a user of an intra-aural device 20 in accordance with the present invention. The device 10 includes an in-ear microphone (IEM) 22 adapted to be in fluid communication with an outer ear canal 14 of an ear 12 of the user that is occluded from an environment outside the ear 12, typically via the intra-aural device 20. Although an in-ear device is shown in FIG. 1, a person having ordinary skills in the art would readily understand that any other type of hearing protection device can be used without departing from the scope of the present invention, such as an earmuff, an extra-aural device, an over the ear device or the like, and provide the required occlusion, whatever its location is as long as the IEM 22 captures a signal from inside the occlusion. The device 10 further includes a processing unit 24 operatively connected to the in-ear microphone 22 to receive an internal signal (IEM signal) therefrom. The processing unit 24 is typically configured to execute the method for detecting the presence of voice from the user as hereinafter described. Also, the processing unit 24 could be embedded into the intra-aural device 20 or be located away therefrom while being in operative connection with the in-ear microphone 22.

The device 10, typically connects to a communication device 16, via wires and/or wireless, to at least provide a signal thereto when the presence of voice or speech from the user is detected. Upon such a detection, the communication device 16 may communicate, preferably both ways (transmit and receive) via a communication interface 18 connected thereto, with any other device (not shown).

Optionally, to either improve the detection of the presence of a user's voice or to allow in further processing the signal captured by the IEM 22, the device 10 further includes an outer-ear microphone (OEM) 30 adapted to be in fluid communication with the environment outside the ear 12, and the processing unit 24 also operatively connects to the outer-ear microphone 30 to receive an external signal (OEM signal) therefrom.

Upon communication of the device 10 with the communication device 16, the device 10 typically further includes a speaker 32 in fluid communication with the outer-ear canal 14 to transmit sound signals received from the communication device 16 to the user.

Figure 2:
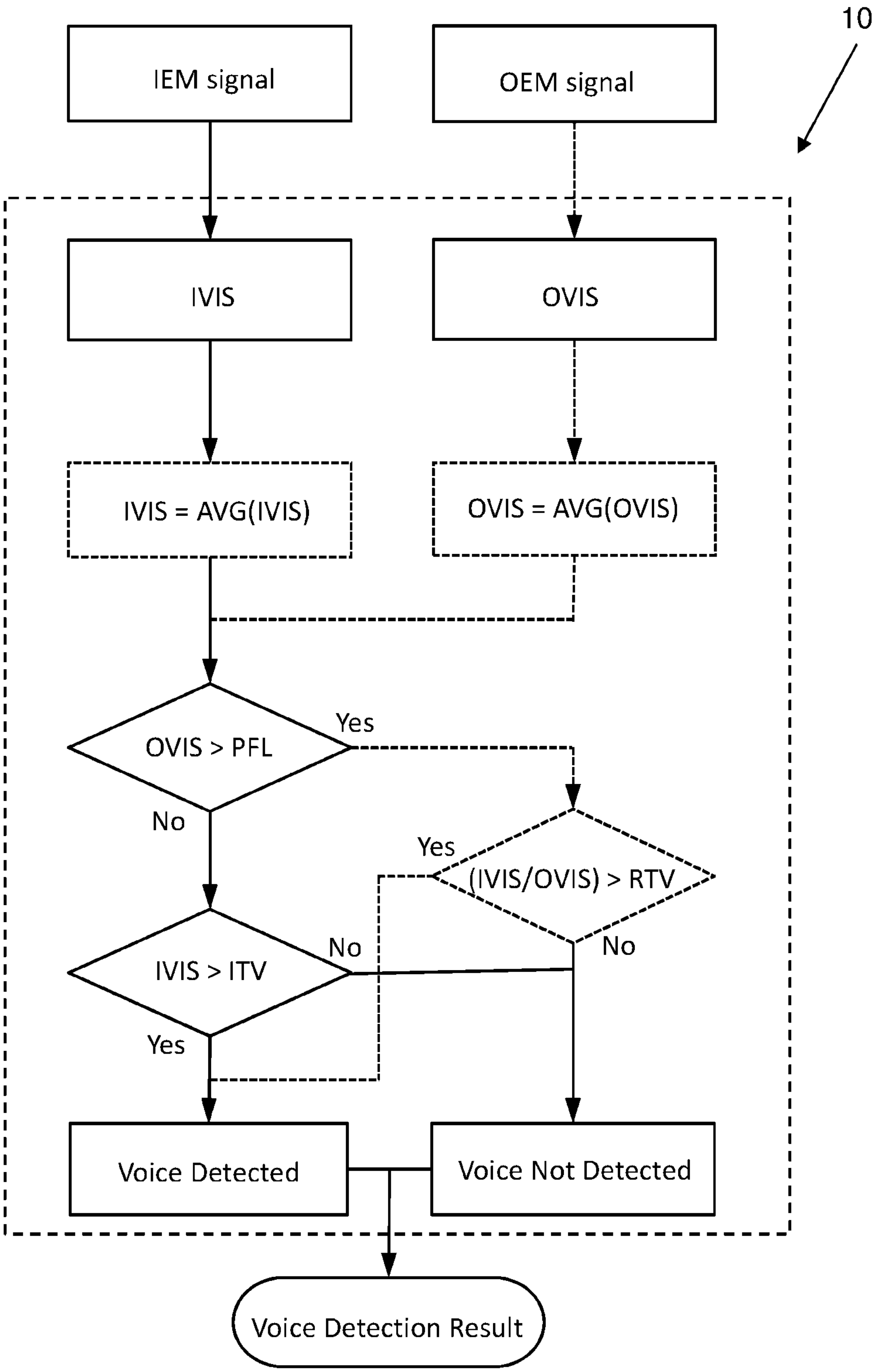
FIG. 2 is a schematic flow diagram representation of a method for detecting voice of a user of the intra-aural device of FIG. 1 in accordance with an embodiment of the present invention.

Now referring more specifically to FIG. 2, there is shown a block diagram depicting a method for detecting the presence of voice of a user of an intra-aural device 20 in accordance with an embodiment with the present invention. The method typically includes the steps of 1)—obtaining a signal provided by the in-ear microphone 22 to determine an acquired voice indicator signal, and 2)—detecting voice produced by the user by comparing the acquired voice indicator signal with a corresponding threshold value, upon the acquired voice indicator signal being larger than the corresponding threshold value. The step of detecting includes reducing (or attenuating) any voice interference coming from a non-user such as the voice of any co-worker located nearby the user or the like.

Typically, the acquired voice indicator signal is an in-ear microphone voice indicator signal (IVIS) and the corresponding threshold value is an in-ear microphone threshold value (ITV). The in-ear microphone voice indicator signal (IVIS) is typically represented as a signal such as the "R2" signal as detailed in reference [1], but could also be any similar factor signal. For example, such "R2" factor takes into consideration averaging and filtering of the signal provided by the in-ear microphone 22.

As represented in a stippled line rectangle in FIG. 2, the step of obtaining preferably includes averaging the in-ear microphone voice indicator signal (IVIS) over a predetermined time period, which in a preferred embodiment, would be configurable.

Typically, the step of obtaining includes processing the signal provided by the in-ear microphone 22 using a voice detector algorithm to determine the acquired voice indicator signal, or the in-ear microphone voice indicator signal (IVIS).

Additionally, signal filtering is typically embedded in the averaging process of the signal provided by the in-ear microphone 22.

Preferably, as illustrated with stippled line arrows in FIG. 2, the method preferably further includes the step of obtaining a signal provided by the outer-ear microphone 30; and wherein the acquired voice indicator signal becomes a ratio of the in-ear microphone voice indicator signal (IVIS) over an outer-ear microphone voice indicator signal (OVIS), and the corresponding threshold value becomes a ratio threshold value (RTV), upon the outer-ear microphone voice indicator signal (OVIS) being larger than a predetermined floor level (PFL). Obviously, when no OEM 30 is present in the device 10, the outer-ear microphone voice indicator signal (OVIS) is null (zero) and therefore smaller than the predetermined floor level (PFL), such that the above described method steps are performed. The step of detecting includes removing any voice interference coming from a non-user (such as the voice of any co-worker located nearby the user, or even the voice of the user picked-up by the OEM 30, or the like), to improve on the accuracy of the voice detection result provided by the device 10 as output.

Similarly to the above method embodiment with only the IEM 22, the step of obtaining a signal provided by the outer-ear microphone includes averaging the in-ear microphone voice indicator signal (IVIS) and the outer-ear microphone voice indicator signal (OVIS) over the predetermined time period. In addition, the step includes processing the signal provided by the outer-ear microphone 30 using the voice detector algorithm to determine the acquired voice indicator signal, based on both the in-ear microphone (IVIS) and the outer-ear microphone (OVIS) voice indicator signals.

Furthermore, signal filtering could also be embedded in the averaging process of the signal provided by the outer-ear microphone 30.

Although the present disclosure has been described with a certain degree of particularity and by way of an illustrative embodiment and examples thereof, it is to be understood that the present disclosure is not limited to the features of the embodiments described and illustrated herein, but includes all variations and modifications within the scope and spirit of the disclosure as hereinafter claimed.

LIST OF REFERENCES

[1] Lezzoum, N., Gagnon, G., and Voix, J., "Voice Activity Detection System for Smart Earphones", IEEE Transactions on Consumer Electronics, Vol. 60, No. 4, pp 737-744, November 2014.

The invention claimed is:

1. A method for detecting voice of a user of an intra-aural device, the intra-aural device having an in-ear microphone adapted to be in fluid communication with an outer-ear ear canal of the user occluded from an environment outside the ear by the intra-aural device, the method comprising the steps of:

obtaining a signal provided by the in-ear microphone, the signal being influenced by an occlusion effect within the occluded outer-ear ear canal caused by bone and tissue conducted vibrations from the user, thereby distorting an in-ear frequency profile of the signal relative to an open-air voice signal;

processing the signal provided by the in-ear microphone to determine an acquired voice indicator signal, and to filter the signal over a predetermined frequency range to isolate the user's voice from the distorted in-ear frequency profile while accounting for wearer-induced disturbances specific to the intra-aural device; and detecting voice produced by the user by comparing the acquired voice indicator signal with a corresponding threshold value, upon the acquired voice indicator signal being larger than the corresponding threshold value, and wherein the processing and detecting steps reduce any voice interference coming from a non-user by controlling the distorted in-ear frequency profile enhanced by the occlusion effect relative to an external noise.

2. The method of claim 1, wherein the acquired voice indicator signal is an in-ear microphone voice indicator signal (IVIS) and the corresponding threshold value is an in-ear microphone threshold value (ITV).

3. The method of claim 2, wherein the step of processing includes processing the signal provided by the in-ear microphone using a voice detector algorithm to determine the acquired voice indicator signal.

4. The method of claim 2, wherein the step of obtaining includes the step of:

averaging the in-ear microphone voice indicator signal (IVIS) over a predetermined time period.

5. The method of claim 1, wherein the intra-aural device has an outer-ear microphone adapted to be in fluid communication with the environment outside the ear, the method further comprising the step of processing a signal provided by the outer-ear microphone; and wherein the acquired voice indicator signal is a ratio of an in-ear microphone voice indicator signal (IVIS) over an outer-ear microphone voice indicator signal (OVIS), and the corresponding threshold value is a ratio threshold value (RTV), upon the outer-ear microphone voice indicator signal (OVIS) being larger than a predetermined floor level (PFL), and wherein the step of detecting voice produced by the user further removes any voice interference coming from a non-user.

6. The method of claim 5, wherein the step of processing a signal provided by the outer-ear microphone includes processing the signal provided by the inner-ear microphone and a signal provided by the outer-ear microphone using a voice detector algorithm to determine the acquired voice indicator signal.

7. The method of claim 5, wherein the step of obtaining includes the step of:

averaging the in-ear microphone voice indicator signal (IVIS) and the outer-ear microphone voice indicator signal (OVIS) over a predetermined time period.

8. The method of claim 5, wherein the step of processing includes filtering the signal provided by the in-ear microphone and the signal provided by the outer-ear microphone over a predetermined frequency range.

9. A voice detector device for detecting voice of a user of an intra-aural device, the voice detector device comprising:

an in-ear microphone adapted to be in fluid communication with an outer ear canal of an ear of the user occluded from an environment outside the ear; and a processing unit operatively connected to the in-ear microphone to receive an internal signal therefrom, the processing unit being configured so as to:

execute the method of claim 1 for detecting voice of the user of the intra-aural device.

10. A voice detector device for detecting voice of a user of an intra-aural device, the voice detector device comprising:

an in-ear microphone adapted to be in fluid communication with an outer ear canal of an ear of the user occluded from an environment outside the ear;

an outer-ear microphone adapted to be in fluid communication with the environment outside the ear; and a processing unit operatively connected to the in-ear microphone and the outer-ear microphone to receive an internal signal and an external signal therefrom, respectively, the processing unit being configured so as to:

further execute the method of claim 6 for detecting voice of the user of the intra-aural device.

* * * * *